Patented Mar. 20, 1928.

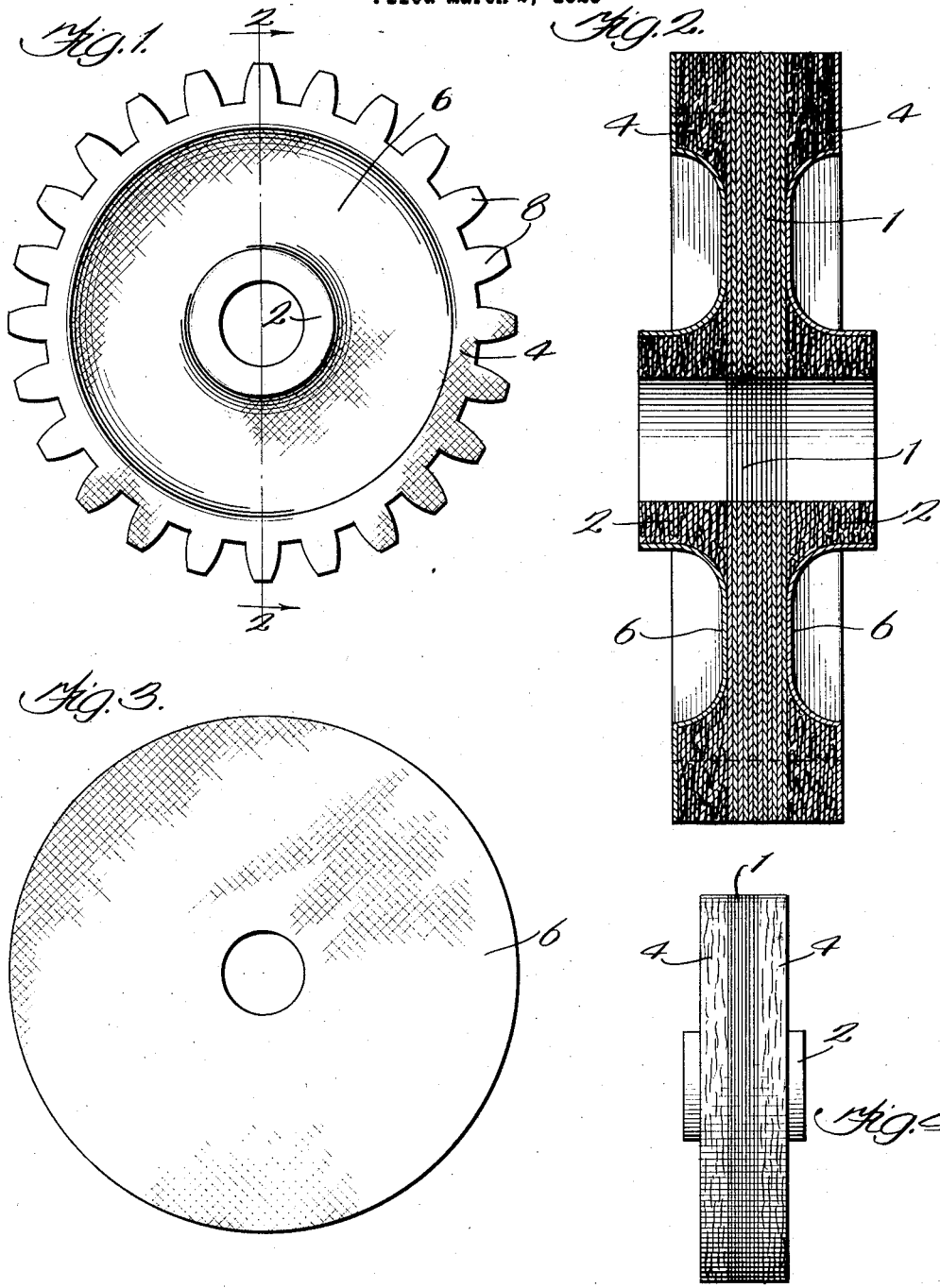

1,663,477

UNITED STATES PATENT OFFICE.

LOUIS T. FREDERICK, OF VALPARAISO, INDIANA, ASSIGNOR TO FIBROC INSULATION COMPANY, OF VALPARAISO, INDIANA, A CORPORATION OF INDIANA.

COMPOSITE GEAR AND METHOD OF MAKING SAME.

Application filed March 2, 1925. Serial No. 12,498.

My invention relates to composite gears, sometimes referred to as "silent gears", and is concerned more particularly with the gear blanks, the teeth being usually cut at a subsequent operation. Gears of this class consist of laminated or composite material, for example, fabric arranged in layers and unified by means of a binder such as bakelite. It is customary to cut the fabric into discs of proper diameter and to provide for the central opening by cutting away other discs at the center. Duck or canvas are commonly employed, and these materials are of course expensive, and it is desirable to utilize the scraps where possible. Various expedients have been practiced, and the object of my present invention is to provide an advantageous and practical method for utilizing the scrap material and at the same time producing a strong and reliable gear blank.

I accomplish my objects in the manner illustrated in the accompanying drawings in which Figure 1 is a side view of a completed gear made in accordance with my invention. This figure represents the gear blank after the teeth have been cut.

Figure 2 is a sectional view on the line 2—2 Figure 1.

Figure 3 is a face view of a facing sheet which I employ for imparting a finished appearance to the completed blank.

Figure 4 is an edge view of the completed blank.

Like numerals denote like parts throughout the several views.

In practicing my method I first prepare a plurality of discs 1. These are usually prepared in the following manner:

A sheet of the fabric is impregnated with the binder and then dried, after which the dried impregnated strip is cut into discs apertured at the center. According to my method I take the scrap material resulting from the preparation of the discs and cut or grind it into comparatively small pieces. I then assemble the material in a mold according to the arrangement illustrated in section in Figure 2. The central zone of the assemblage consists of layers of the centrally apertured discs 1. They are of the full diameter of the blank and form a full size central frame or core. By preference the web portion of the blank is composed entirely of these discs. On both sides of these discs I assemble a quantity 2 of scrap material around the central opening to form a hub and a quantity 4 around the peripheral portion to form a thickened rim. Of course the assemblage will be done in a mold, but molds for similar purposes are well known and need not be here shown. As the scrap material is the result of cutting or grinding, it is composed of pieces of various sizes, some of it being mere shreds and some even resembling powder; hence it is simply poured into the mold without any attempt to arrange the particles flatwise. For the sake of appearances as well as for additional strength it is desirable to place facing sheets 6 on both surfaces of the gear. Before assembly these are in the form of centrally apertured discs shown in Figure 3.

After the parts are properly assembled in the mold they are subjected to heat and pressure in accordance with the method well known to laminators. This heating and pressing hardens the binder and consolidates the whole into a strong, tough, unitary mass, after which the teeth 8 may be cut by hobbing or any other suitable process.

I have mentioned bakelite as typical of those condensation products made, for example, of phenol and formaldehyde and capable of hardening under heat and pressure.

Having thus described my invention what I claim as new and desire to secure by Letters Patent is:

1. A gear blank of the character specified having a thickened rim portion and a thickened hub portion, the web portion being composed of parallel discs of woven fabric extending to the circumference of the blank, and the rim and hub portion at the side of the discs being composed of a mixture of small scraps of fabric, and a binder composed of a phenolic condensation product in hardened form.

2. The method of making gear blanks consisting in impregnating woven fabric with a phenolic condensation product, cutting the same into discs extending from center to circumference of the blank, reducing the scraps to small pieces, laying the discs flatwise upon each other to form the web and entire central zone of the blank, arranging quantities of the scraps in a heterogeneous mixture in a circle on both sides of the gear around the central opening to form an amorphous hub, and at the periphery to form a thickened rim portion and subjecting the whole to heat and pressure to harden, consolidate and unify the entire mass.

In witness whereof, I have hereunto subscribed my name.

LOUIS T. FREDERICK.